(12) United States Patent
Jong et al.

(10) Patent No.: US 7,039,323 B2
(45) Date of Patent: May 2, 2006

(54) OPTICAL TRANSMITTER FOR TRANSMITTING A PLURALITY OF OUTPUT SIGNALS

(75) Inventors: Jyh-Ming Jong, Saratoga, CA (US); Drew G. Doblar, San Jose, CA (US); Daniel R. Cassiday, Topsfield, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 613 days.

(21) Appl. No.: 09/929,153

(22) Filed: Aug. 13, 2001

(65) Prior Publication Data

US 2003/0030872 A1 Feb. 13, 2003

(51) Int. Cl.
H04B 10/00 (2006.01)
H04B 10/04 (2006.01)
(52) U.S. Cl. .................... 398/155; 398/154; 398/182
(58) Field of Classification Search ............. 398/154, 398/155, 182; 375/303, 306, 307; 332/127, 332/128
See application file for complete search history.

(56) References Cited

U.S. PATENT DOCUMENTS

| | | | | |
|---|---|---|---|---|
| 5,652,767 | A | 7/1997 | Kiyonaga et al. | 375/317 |
| 5,898,741 | A | 4/1999 | Nagashima | 375/347 |
| 5,982,210 | A | 11/1999 | Rogers | 327/156 |
| 5,991,339 | A | 11/1999 | Bazes et al. | 375/232 |
| 6,148,215 | A * | 11/2000 | Doi et al. | 455/552.1 |
| 6,169,435 | B1 * | 1/2001 | Fujii et al. | 327/261 |
| 6,178,212 | B1 | 1/2001 | Akashi | 375/355 |
| 6,181,757 | B1 | 1/2001 | Neumann et al. | 375/375 |
| 6,718,143 | B1 | 4/2004 | Wijntnes | 398/202 |
| 2001/0021051 | A1 | 9/2001 | Kim | 359/161 |
| 2002/0093994 | A1 | 7/2002 | Hendrickson et al. | 370/536 |

FOREIGN PATENT DOCUMENTS

| | | |
|---|---|---|
| EP | 0996262 A | 4/2000 |
| GB | 2246677 A | 2/1992 |

OTHER PUBLICATIONS

A Monolithic 480 MB/s Parallel AGC/Decision/Clock-Recovery Circuit in 1.2µm CMOS, Timothy H. Hu and Paul R. Gray, Dec. 1993, IEEE Journal of Solid-State Circuits, vol. 28, No. 12.
InfiniBand Architecture Release 1.0a, Jun. 19, 2001, Chapter 6: High Speed Electrical Signaling—2.5 Gb/s.
InfiniBand Architecture Release 1.0a, Jun. 19, 2001, Chapter 8: Fiber Attachment—2.5 Gb/s.

* cited by examiner

Primary Examiner—Jason Chan
Assistant Examiner—Dalzid Singh
(74) Attorney, Agent, or Firm—Park, Vaughan & Fleming LLP

(57) ABSTRACT

An optical transmitter for transmitting a first output data signal and a second output data signal, the optical transmitter comprising: a phase-locked-loop, the phase-locked-loop operable to receive a reference clock signal; a clock-recovery circuit, the clock-recovery circuit coupled to the phase-locked-loop, the clock-recovery circuit operable to receive a first input data signal; a latch-decision circuit, the latch-decision circuit coupled to the clock-recovery circuit; a latch, the latch coupled to the latch-decision circuit, the latch operable to receive the first input data signal and the second input data signal; a first electro-optical converter, the first electro-optical converter coupled to the latch, the first electro-optical converter operable to transmit the first output data signal; and a second electro-optical converter, the second electro-optical converter coupled to the latch, the second electro-optical converter operable to transmit the second output data signal.

10 Claims, 5 Drawing Sheets

OPTICAL TRANSMITTER FOR TRANSMITTING A PLURALITY OF OUTPUT SIGNALS

This patent application discloses subject matter that is related to the subject matter disclosed in U.S. patent application Ser. No. 09/929,150 entitled "Optical Receiver for Receiving a Plurality of Input Signals" filed on even date herein.

1. FIELD OF THE INVENTION

The present invention generally relates to optical transmitters. More specifically, the present invention relates to optical transmitters that include multiple electro-optical converters.

2. BACKGROUND

Figure 1:
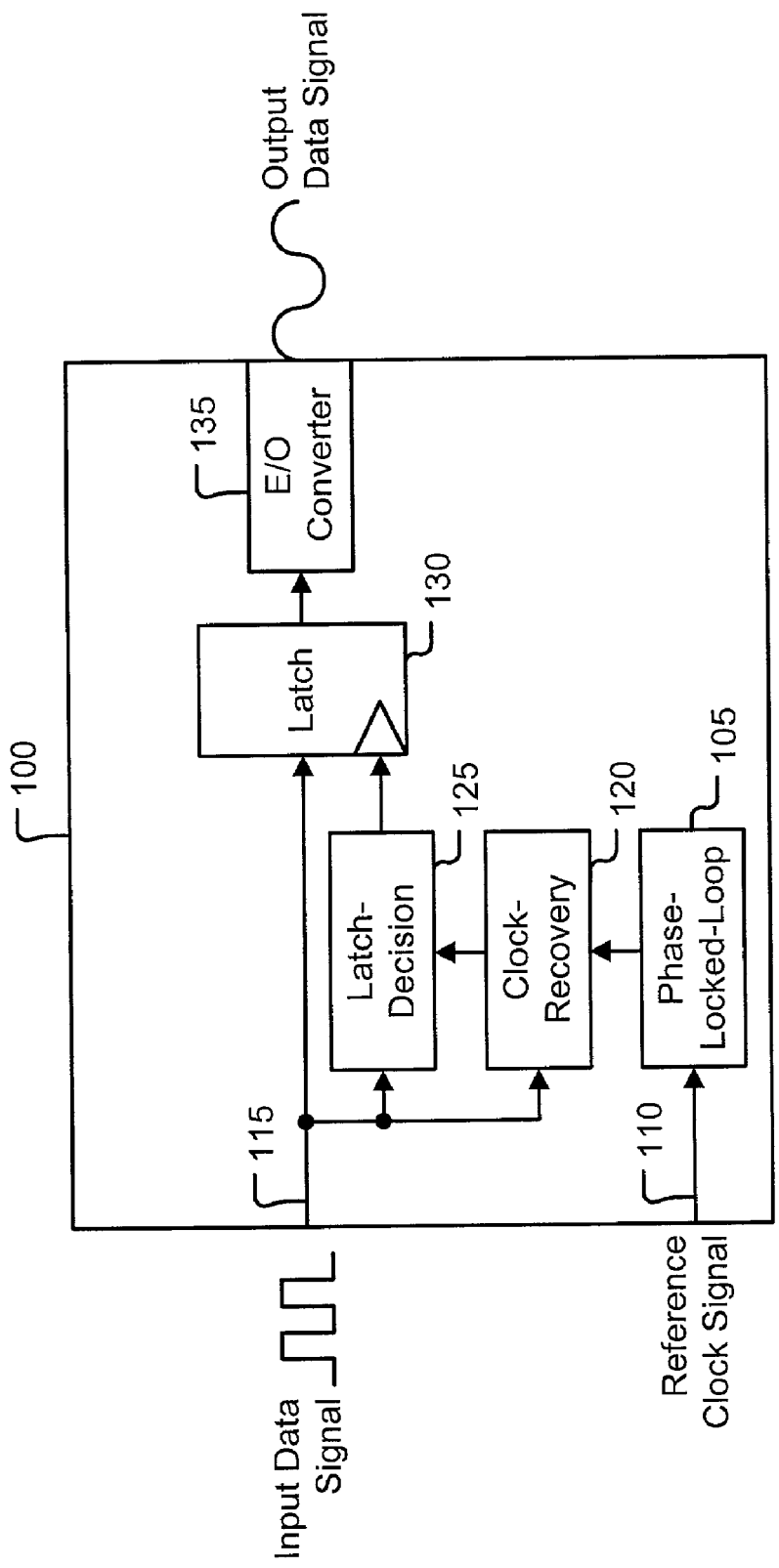

Some modern communication systems, such as InfiniBand systems, require high-speed electrical signals to be converted into high-speed optical signals. Because optical functionality is relatively expensive when compared to electronic functionality, the overall system costs can generally be minimized by using optical components, such as lasers and fiber optic cables, that are as low performance as can be tolerated. In order to minimize optical jitter, such communication systems utilize signal conditioning circuits in the electrical domain to reduce jitter from the electrical signals that are converted into optical signals. FIG. 1 presents a prior art optical transmitter 100.

The optical transmitter 100 includes a phase-locked-loop 105. The phase-locked-loop 105 receives a reference clock signal 110 and generates a plurality of clock signals. Each of the plurality of clock signals has a frequency that is approximately equal to the frequency of the input data signal 115. However, the phase of each of the clock signals differ. For example, each clock signal may have a phase that differs by a predetermined multiple, such as π/6 radians, from its phase-adjacent clock signal. In this way, an entire cycle (2π radians) of the clock signal can be covered by evenly spaced (in terms of phase) clock signals.

The optical transmitter 100 also includes a clock-recovery circuit 120. The clock-recovery circuit 120 is coupled to the phase-locked-loop 105. In addition, the clock-recovery circuit 120 is operable to receive an input data signal 115. As is known in the art, the clock-recovery circuit 120 is operable to extract timing information from the input data signal 115.

The optical transmitter 100 also includes a latch-decision circuit 125. The latch-decision circuit 125 is coupled to the clock-recovery circuit 120. The latch-decision circuit 125 may also be operable to receive the input data signal 115. The latch-decision circuit 125 is operable to determine, using algorithms known in the art, an appropriate time to latch the input data signal 115 so that the input data signal 115 is sampled near the center portion of each pulse that corresponds to either logic "1" or logic "0." Such a determination is based upon the timing information that is received from the clock-recovery circuit 120 and information extracted from the input data signal 115.

The optical transmitter 100 also includes a latch 130. The strobe input of the latch 130 is coupled to the latch-decision circuit 125. The data input of the latch 130 is operable to receive the input data signal 115.

The optical transmitter 100 also includes an electro-optical converter 135. The electro-optical converter 135 is coupled to the latch 130. The electro-optical converter 135, which typically includes a laser, is operable to generate an optical signal that is compliant with the InfiniBand specification.

The phase-locked-loop 105, the clock recovery circuit 120, the latch decision circuit 125, and the latch 130 work together to minimize the jitter in the input data signal 115. Thus, a low performance electro-optical converter 135 can be utilized to reduce the cost of the optical transmitter 100.

In order to increase the bandwidth of InfiniBand links, the InfiniBand specification provides for optical transmitters that include multiple electro-optical converters. For example, one InfiniBand link, which is known as a 4 X link, includes 4 electro-optical converters. Another InfiniBand link, which is known as a 12 X link, includes 12 electro-optical converters.

Figure 2:
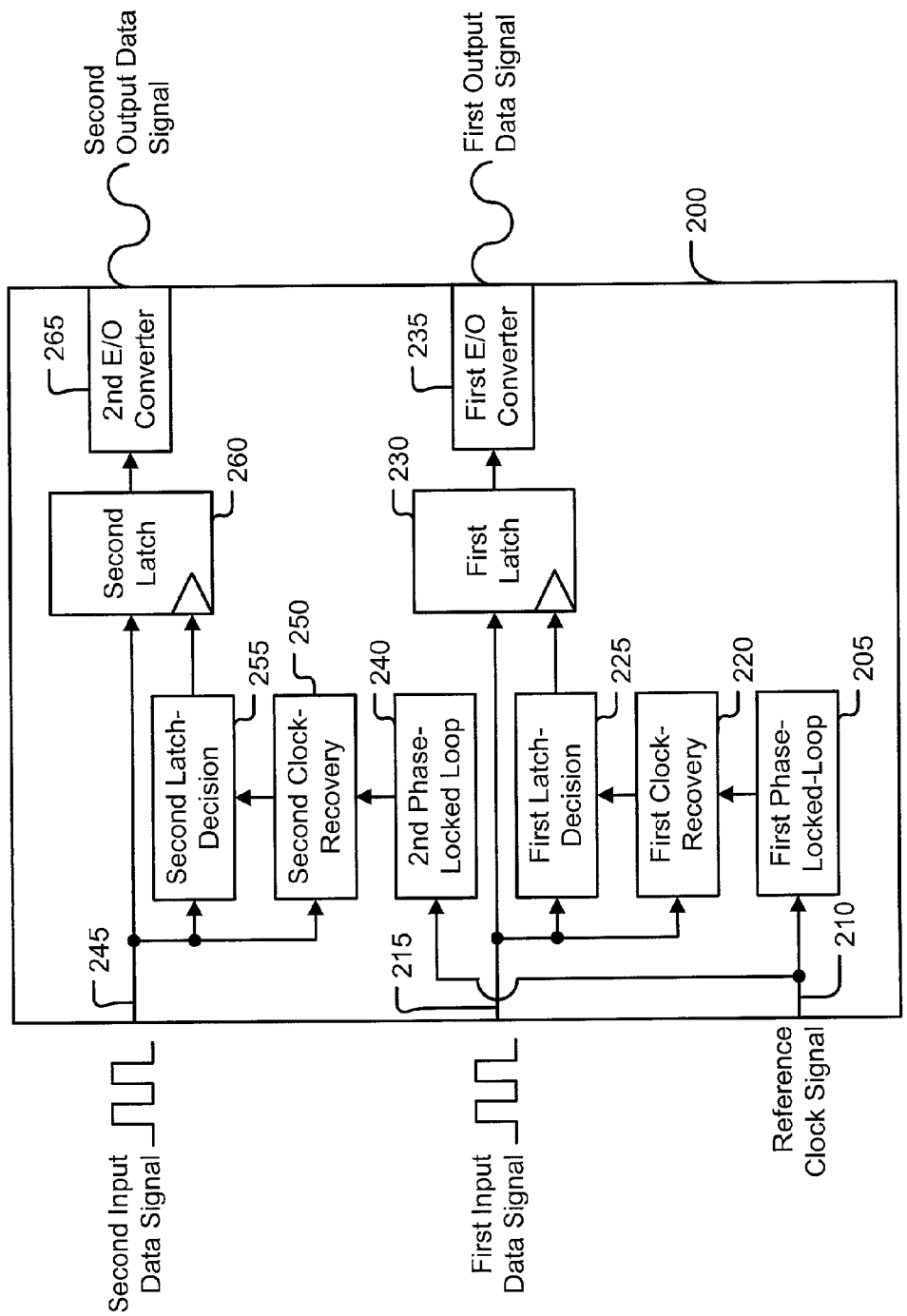

FIG. 2 presents a portion of a prior art optical transmitter 200 that includes multiple electro-optical converters. The optical transmitter 200 includes a first phase-locked-loop 205 and a first clock-recovery circuit 220. The first clock-recovery circuit 220 is coupled to the first phase-locked-loop 205 and is operable to receive a first input data signal 215. The optical transmitter 200 also includes a first latch-decision circuit 225 that is coupled to the first clock-recovery circuit 220 and may also be operable to receive the first input data signal 215. The optical transmitter 200 also includes a first latch 230 that is coupled to the first latch-decision circuit 225 and is operable to receive the first input data signal 215. The optical transmitter 200 also includes a first electro-optical converter 235 that is coupled to the first latch 230.

As shown in FIG. 2, the optical transmitter 200 also includes a second phase-locked-loop 240, a second clock-recovery circuit 250, a second latch-decision circuit 255, a second latch 260, and a second electro-optical converter 265.

The first phase-locked-loop 205, the first clock recovery circuit 220, the first latch-decision circuit 225, and the first latch 230 work together to minimize the jitter in the first input data signal 215. Similarly, the second phase-locked-loop 240, the second clock-recovery circuit 250, the second latch-decision circuit 255, and the second latch 260 work together to minimize the jitter in the second input data signal 245. Thus, low performance electro-optical converters 235 and 265 can be utilized to reduce the cost of the optical transmitter 200.

While the optical transmitter 200 can generate high quality optical signals that are compliant with the InfiniBand specification, the cost of such a transmitter is significant. Thus, a need exists for a cost-reduced optical transmitter that utilizes a reduced die-size and uses lower power than the prior art, and that is operable to receive high-speed optical input signals.

3. SUMMARY OF INVENTION

One embodiment of the invention is an optical transmitter for transmitting a first output data signal and a second output data signal. The optical transmitter includes: a phase-locked-loop, the phase-locked-loop operable to receive a reference clock signal; a clock-recovery circuit, the clock-recovery circuit coupled to the phase-locked-loop, the clock-recovery circuit operable to receive a first input data signal; a first latch-decision circuit, the first latch-decision circuit coupled to the clock-recovery circuit; a first latch, the first latch coupled to the first latch-decision circuit, the first latch operable to receive the first input data signal; a first electro-optical converter, the first electro-optical converter coupled to the first latch, the first electro-optical converter operable to transmit the first output data signal; a second latch-decision circuit, the second latch-decision circuit coupled to the clock-recovery circuit; a second latch, the second latch coupled to the second latch-decision circuit, the second latch operable to receive the second input data signal; and a second electro-optical converter, the second electro-optical converter coupled to the second latch, the second electro-optical converter operable to transmit the second output data signal.

Another embodiment of the invention is an optical transmitter for transmitting a first output data signal and a second output data signal. The optical transmitter includes: a phase-locked-loop, the phase-locked-loop operable to receive a reference clock signal; a clock-recovery circuit, the clock-recovery circuit coupled to the phase-locked-loop, the clock-recovery circuit operable to receive a first input data signal; a latch-decision circuit, the latch-decision circuit coupled to the clock-recovery circuit; a first latch, the first latch coupled to the latch-decision circuit, the first latch operable to receive the first input data signal; a first electro-optical converter, the first electro-optical converter coupled to the first latch, the first electro-optical converter operable to transmit the first output data signal; a second latch, the second latch coupled to the latch-decision circuit, the second latch operable to receive the second input data signal; and a second electro-optical converter, the second electro-optical converter coupled to the second latch, the second electro-optical converter operable to transmit the second output data signal.

Still another embodiment of the invention is an optical transmitter for transmitting a first output data signal and a second output data signal. This optical transmitter includes: a phase-locked-loop, the phase-locked-loop operable to receive a reference clock signal; a clock-recovery circuit, the clock-recovery circuit coupled to the phase-locked-loop, the clock-recovery circuit operable to receive a first input data signal; a latch-decision circuit, the latch-decision circuit coupled to the clock-recovery circuit; a latch, the latch coupled to the latch-decision circuit, the latch operable to receive the first input data signal and the second input data signal; a first electro-optical converter, the first electro-optical converter coupled to the latch, the first electro-optical converter operable to transmit the first output data signal; and a second electro-optical converter, the second electro-optical converter coupled to the latch, the second electro-optical converter operable to transmit the second output data signal.

4. BRIEF DESCRIPTION OF THE FIGURES

FIG. 1 presents a prior art optical transmitter.

FIG. 2 presents a prior art optical transmitter that includes multiple electro-optical converters.

Figure 3:
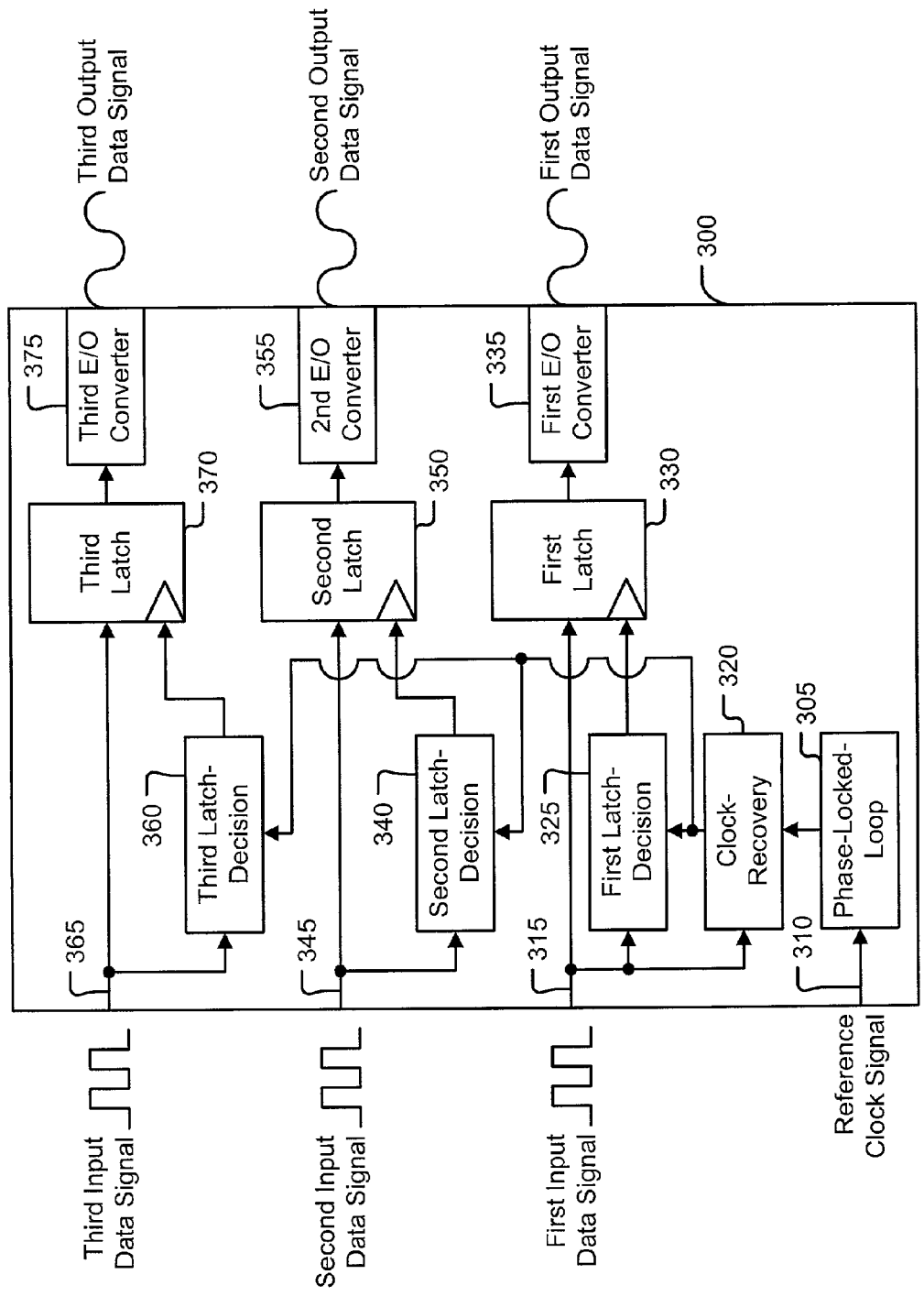

FIG. 3 presents an improved optical transmitter that includes a single clock-recovery circuit.

Figure 4:
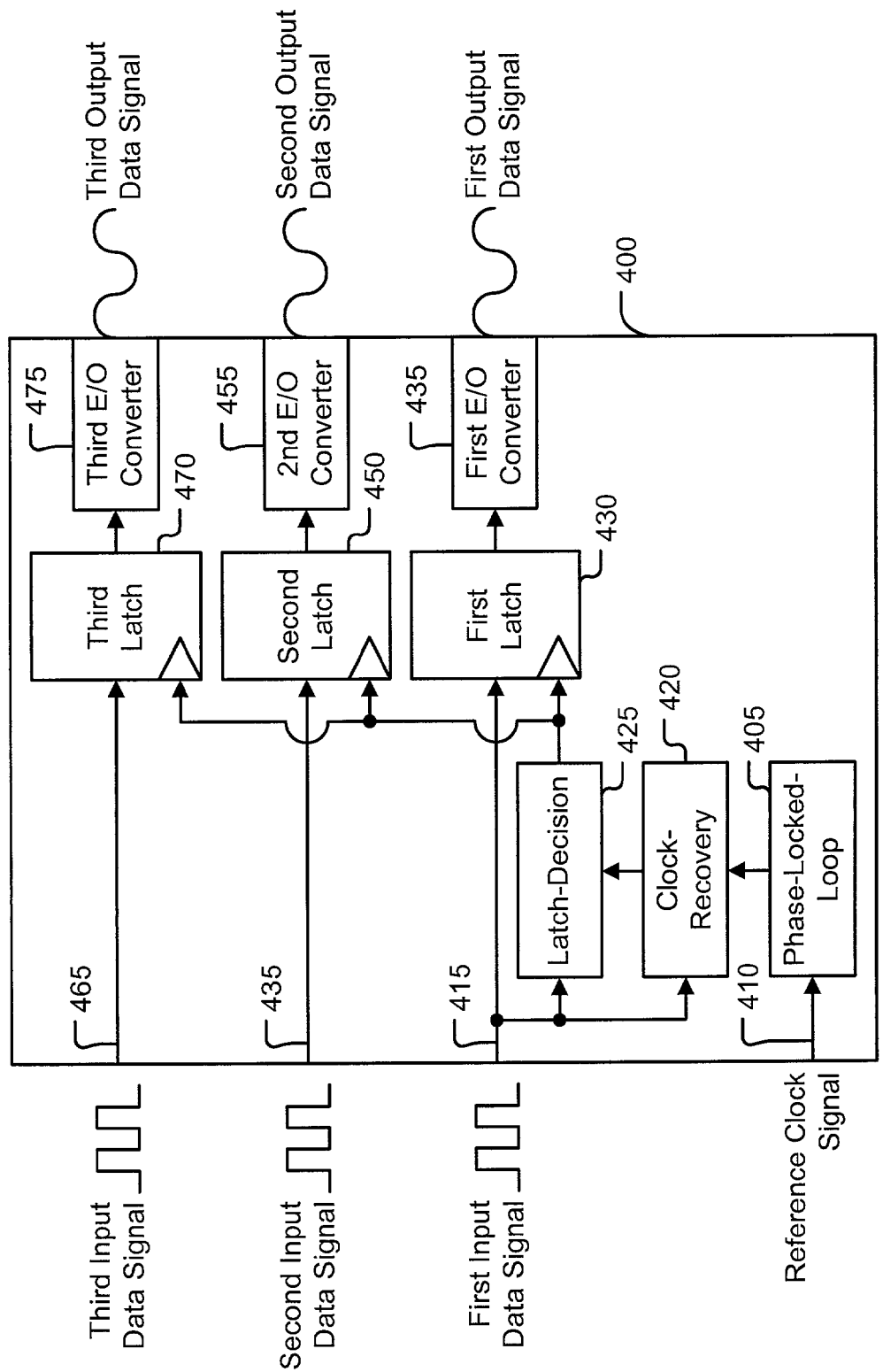

FIG. 4 presents an improved optical transmitter that includes a single latch-decision circuit.

Figure 5:
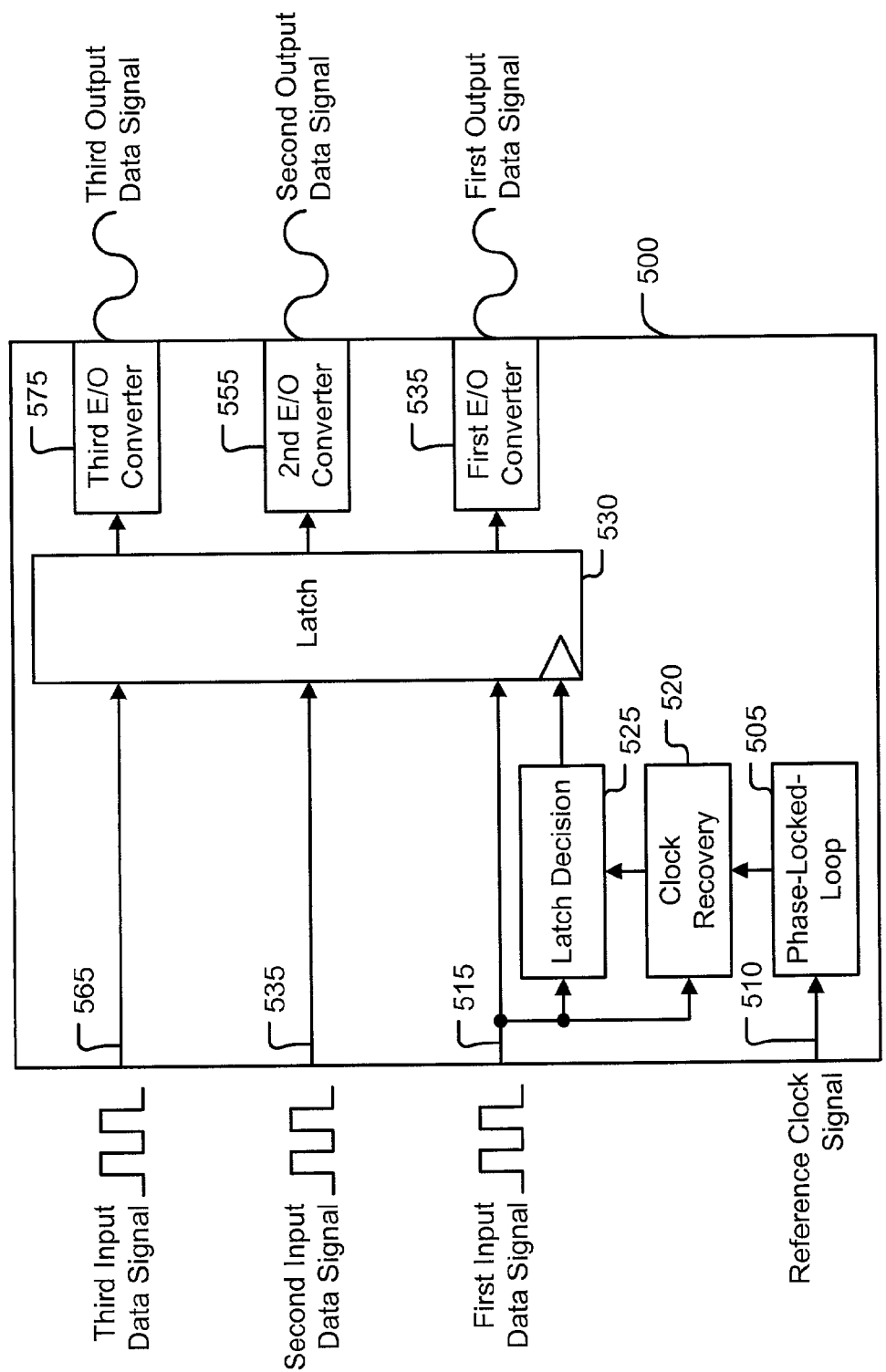

FIG. 5 presents an improved optical transmitter that includes a single multiple-channel latch.

5. DESCRIPTION OF THE PREFERRED EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

5.1 An Optical Transmitter with a Single Clock-Recovery Circuit

FIG. 3 presents an optical transmitter 300. As will be discussed below, the optical transmitter 300 can be manufactured at a lower cost than prior art optical transmitters with multiple electro-optical converters.

The optical transmitter 300 includes a phase-locked-loop 305 that receives a reference clock signal 310 and generates a plurality of clock signals. Each of the plurality of clock signals has a frequency that is approximately equal to the frequency of the first input data signal 315. However, each of the clock signals has a phase that differs by a predetermined multiple, such as $\pi/4$, $\pi/6$, $\pi/8$, or $\pi/16$ radians, from its phase-adjacent clock signal. Thus, at least one of the plurality of clock signals will have a phase that is not equal to the phase of the reference clock signal 310.

The optical transmitter 300 also includes a clock-recovery circuit 320. The clock-recovery circuit 320 is coupled to the phase-locked-loop 305. In addition, the clock-recovery circuit 320 is operable to receive a first input data signal 315. Using techniques that are known in the art, the clock-recovery circuit 320 is operable to extract timing information from the first input data signal 315.

The optical transmitter 300 also includes a first latch-decision circuit 325. The first latch-decision circuit 325 is coupled to the clock-recovery circuit 320. In addition, in some embodiments of the invention, the first latch-decision circuit 325 may also be operable to receive the first input data signal 315. Using algorithms that are known in the art, the first latch-decision circuit 325 is operable to determine an appropriate time to latch the first input data signal 315 so that the first input data signal 315 is sampled near the center portion of each pulse that corresponds to either logic "1" or logic "0." Such a determination is based upon the timing information that is received from the clock-recovery circuit 320 and, optionally, information extracted from the first input data signal 315.

Referring again to FIG. 3, the optical transmitter 300 also includes a first latch 330. The strobe input of the first latch 330 is coupled to the first latch-decision circuit 325. The data input of the first latch 330 is operable to receive the first input data signal 315.

The optical transmitter 300 also includes a first electro-optical converter 335. In some embodiments of the invention, the electro-optical converter 335 includes a laser. In other embodiments of the invention, the electro-optical converter includes alternative light sources such as an LED. In some embodiments of the invention, the electro-optical converter 335 is operable to generate an optical signal that is compliant with the InfiniBand specification.

The optical transmitter 300 also includes a second latch-decision circuit 340. The second latch-decision circuit 340 is coupled to the clock-recovery circuit 320. In addition, in some embodiments of the invention, the second latch-decision circuit 340 may also be operable to receive the second input data signal 345. The second latch-decision circuit 340 is operable to determine an appropriate time to latch the second input data signal 345 so that the second input data signal 345 is sampled near the center portion of each pulse that corresponds to either logic "1" or logic "0." Such a determination is based upon the timing information that is received from the clock-recovery circuit 320 and, optionally, information extracted from the second input data signal 345.

Referring again to FIG. 3, the optical transmitter 300 also includes a second latch 350. The strobe input of the second latch 350 is coupled to the second latch-decision circuit 340. The data input of the second latch 350 is operable to receive the second input data signal 345.

The optical transmitter 300 also includes a second electro-optical converter 355 that is coupled to the second latch 350. This electro-optical converter 355 is similar to electro-optical converter 335 that was described above.

In some embodiments of the invention, additional latch-decision circuits, latches, and electro-optical converters may be present. For example, the optical transmitter 300 includes a third latch-decision circuit 360 that is coupled to the clock-recovery circuit 320 and is operable to receive the third input data signal 365. The optical transmitter 300 includes a third latch 370 that is coupled to the third latch-decision circuitry 360 and is operable to receive the third input data signal 365. Further, the optical transmitter 300 includes a third electro-optical converter 375 that is coupled to the third latch 370.

In still other embodiments of the invention, the optical transmitter may include 4, 8 or 12 latch-decision circuits, latches, and electro-optical converters.

As is evident from FIG. 3, the optical transmitter 300 utilizes a single phase-locked-loop 305 and a single clock-recovery circuit 320 to provide information to a plurality of latch-decision circuits 325, 340, and 360. These latch-decision circuits 325, 340, and 360 control a plurality of latches 330, 350, and 370 that provide data to a plurality of electro-optical converters 335, 355, and 375.

By eliminating multiple instances of clock-recovery circuits, the die size of the optical transmitter 300 can be reduced. As a result, the cost of manufacturing the optical transmitter 300 is less than the cost of manufacturing prior art optical transmitters that include multiple electro-optical converters.

5.2 An Optical Transmitter with a Single Latch-decision Circuit

FIG. 4 presents another cost-reduced optical transmitter 400. The optical transmitter 400 includes a phase-locked-loop 405 that is operable to receive a reference clock signal 410. The phase-locked-loop 405 is similar to the phase-locked-loop 305 described above. The optical transmitter 400 also includes a clock-recovery circuit 420 that is coupled to the phase-locked-loop 405 and is operable to receive the first input data signal 415. The optical transmitter 400 also includes a latch-decision circuit 425. The latch-decision circuit 425 is similar to the latch-decision circuit 325. However, the latch-decision circuit 425 is coupled to a plurality of latches 430, 450, and 470, which are in turn coupled to a plurality of electro-optical converters 435, 455, and 475.

As is evident from FIG. 4, the optical transmitter 400 utilizes a single phase-locked-loop 405, a single clock-recovery circuit 420, and a single latch-decision circuit 425, to control a plurality of latches 430, 450, and 470. These latches 430, 450, and 470 provide data to a plurality of electro-optical converters 435, 455, and 475.

By eliminating multiple instances of clock-recovery circuits and latch-decision circuits the die size of the optical transmitter 400 can be reduced. As a result, the cost of manufacturing the optical transmitter 400 is less than the cost of manufacturing prior art optical transmitters that include multiple electro-optical converters.

5.3 An Optical Transmitter with a Single Multiple-Channel Latch

Another embodiment of the invention is shown in FIG. 5. FIG. 5 presents an optical transmitter 500 that is very similar to the optical transmitter 400 with the exception that the optical transmitter 500 only includes a single latch 530. However, the latch 530 is operable to latch multiple input data signals 515, 535, and 565. Referring to FIG. 5, the strobe input of the latch 530 is coupled to the latch-decision circuit 525.

By replacing multiple latches with a single latch that is operable to latch multiple input data signals, the die size of the optical transmitter 500 can be further reduced. Thus, the cost of manufacturing the optical transmitter 500 is less than the cost of manufacturing prior art optical transmitters that include multiple electro-optical converters.

5.4 Conclusion

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

It is claimed:

1. An optical transmitter for transmitting a first output data signal and a second output data signal, the optical transmitter comprising:
   a) a phase-locked-loop, the phase-locked-loop operable to receive a reference clock signal;
   b) a clock-recovery circuit, the clock-recovery circuit coupled to the phase-locked-loop, the clock-recovery circuit operable to receive a first input data signal, the clock recovery circuit generating a recovered clock signal;
   c) a first latch-decision circuit, the first latch-decision circuit receiving the recovered clock signal;
   d) a first latch, the first latch coupled to the first latch-decision circuit, the first latch operable to receive the first input data signal;
   e) a first electro-optical converter, the first electro-optical converter coupled to the first latch, the first electro-optical converter operable to transmit the first output data signal;
   f) a second latch-decision circuit, the second latch-decision circuit receiving the recovered clock signal;
   g) a second latch, the second latch coupled to the second latch-decision circuit, the second latch operable to receive the second input data signal; and
   h) a second electro-optical converter, the second electro-optical converter coupled to the second latch, the second electro-optical converter operable to transmit the second output data signal; wherein the first latch-decision circuit is configured to determine when to command the first latch to sample the first input data signal based upon (i) timing information received from the clock-recovery circuit and (ii) information extracted from the first input data signal.

2. The optical transmitter for transmitting the first output data signal and the second output data signal of claim 1, wherein the phase-locked-loop is operable to generate a plurality of clock signals that have a frequency approximately equal to the frequency of the reference clock signal.

3. The optical transmitter for transmitting the first output data signal and the second output data signal of claim 1, wherein the phase-locked-loop is operable to generate a plurality of clock signals that have a frequency higher than the frequency of the reference clock signal and wherein at least one of the plurality of clock signals has a phase that is not equal to the phase of the reference clock signal.

4. The optical transmitter for transmitting the first output data signal and the second output data signal of claim 1, wherein the clock-recovery circuit is operable to extract timing information from the first input data signal.

5. The optical transmitter for transmitting the first output data signal and the second output data signal of claim 1, wherein the first latch-decision circuit, based upon timing information received from the clock-recovery circuit, is operable to determine a time to latch the first input data signal.

6. The optical transmitter for transmitting the first output data signal and the second output data signal of claim 1, wherein the first latch-decision circuit is operable to receive the first input data signal.

7. The optical transmitter for transmitting the first output data signal and the second output data signal of claim 1, wherein the first latch-decision circuit is operable to receive the first input data signal and the second latch-decision circuit is operable to receive the second input data signal.

8. The optical transmitter for transmitting the first output data signal and the second output data signal of claim 1, wherein the first latch-decision circuit is operable to receive the first input data signal and, based upon information extracted from the first input data signal and timing information received from the clock-recovery circuit, is operable to determine a time to latch the first input signal.

9. The optical transmitter for transmitting the first output data signal and the second output data signal of claim 1, wherein the first electro-optical converter includes a laser.

10. The optical transmitter for transmitting the first output data signal and the second output data signal of claim 1, wherein the first electro-optical converter is operable to generate an optical signal that is compliant with an optical signal defined in the InfiniBand specification.

* * * * *